(12) United States Patent
Raisigel

(10) Patent No.: US 9,817,413 B2
(45) Date of Patent: Nov. 14, 2017

(54) POWER SUPPLY DEVICE AND METHOD FOR WIRELESS SENSOR UNIT

(71) Applicant: SCHNEIDER ELECTRIC INDUSTRIES SAS, Rueil Malmaison (FR)

(72) Inventor: Hynek Raisigel, Sassenage (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 365 days.

(21) Appl. No.: 14/629,951

(22) Filed: Feb. 24, 2015

(65) Prior Publication Data

US 2015/0253791 A1 Sep. 10, 2015

(30) Foreign Application Priority Data

Mar. 10, 2014 (FR) ...................... 14 51950

(51) Int. Cl.
*H02J 3/32* (2006.01)
*H02J 7/34* (2006.01)
*G05F 1/56* (2006.01)
*H02J 7/02* (2016.01)

(52) U.S. Cl.
CPC ............... *G05F 1/56* (2013.01); *H02J 7/025* (2013.01); *H02J 7/345* (2013.01); *Y10T 307/527* (2015.04)

(58) Field of Classification Search
CPC ........ B23K 11/248; B23K 11/243; H02J 3/04; H01R 29/00; H02B 1/24
USPC .................................................. 307/48, 112
See application file for complete search history.

(56) References Cited

U.S. PATENT DOCUMENTS

| 7,075,768 B2* | 7/2006 | Kaneko ..................... E03C 1/05 361/160 |
|---|---|---|
| 7,132,757 B2 | 11/2006 | Steigerwald et al. |
| 7,501,789 B2* | 3/2009 | O'Donoghue ............ H02J 7/35 320/101 |
| 7,772,798 B2* | 8/2010 | Rodas ....................... H02J 7/35 307/64 |
| 2005/0057874 A1* | 3/2005 | Weindorf .................. H03F 1/52 361/91.5 |
| 2009/0026842 A1 | 1/2009 | Hunter et al. |
| 2011/0310689 A1* | 12/2011 | Hayden .................. G11O 5/147 365/226 |
| 2012/0080952 A1* | 4/2012 | Yoshikuni ................. H02J 1/10 307/52 |

(Continued)

FOREIGN PATENT DOCUMENTS

DE 100 17 902 A1 10/2001
EP 2 395 594 A1 12/2011

(Continued)

OTHER PUBLICATIONS

NN85046368, Apr. 1985, IBM Technical Disclosure.*

(Continued)

*Primary Examiner* — Quan Tra
(74) *Attorney, Agent, or Firm* — Oblon, McClelland, Maier & Neustadt, L.L.P.

(57) ABSTRACT

Electrical power supply device for wireless sensor unit provided with a circuit for managing very low consumption electrical energy configured to limit the given level of electrical power between a lower limit and an upper limit, with the circuit being implemented with a JFET or MOSFET depletion transistor.

13 Claims, 3 Drawing Sheets

(56) References Cited

U.S. PATENT DOCUMENTS

| 2012/0086387 A1* | 4/2012 | Utsuno | H02J 7/35 |
| | | | 320/102 |
| 2013/0234676 A1* | 9/2013 | Cheng | H02J 7/0047 |
| | | | 320/163 |
| 2014/0126258 A1* | 5/2014 | Neyman | H02M 7/2176 |
| | | | 363/89 |

FOREIGN PATENT DOCUMENTS

| JP | 7-59271 | 3/1995 |
| JP | 9-261861 | 10/1997 |

OTHER PUBLICATIONS

French Preliminary Search Report dated Nov. 10, 2014, in Patent Application No. FR 1451950, filed Mar. 10, 2014 (with English Translation of Category of Cited Documents).

* cited by examiner

POWER SUPPLY DEVICE AND METHOD FOR WIRELESS SENSOR UNIT

TECHNICAL FIELD AND PRIOR ART

This application relates to the field of power supply devices for sensor units provided with a wireless communication system and of which the supplying with electrical energy is partially due to a generator that makes it possible to recover an energy in the environment of the sensor unit and to consequently produce an electrical energy.

In the field of wireless sensors, document EP 2,395,594 A1 presents a power supply device that makes it possible to supply a sensor unit through an electrical energy charged in a buffer capacitor.

The power supply device is provided with a first generator of the photovoltaic type which can be supplied, in case of low lighting or zero lighting, by a second electrochemical generator in the form of a rechargeable battery.

A system for managing and controlling the charge of the rechargeable battery is provided in order to render the sensor unit operational even after a long period without lighting.

Rechargeable batteries have for disadvantage of having a limited service life and a reduced electrical charge capacity.

Document U.S. Pat. No. 7,132,757 B2 presents a device for supplying energy to a sensor comprising a first generator making it possible to recover mechanical energy that it transforms into electrical energy and an electrochemical generator for supplying the first generator. The electrochemical generator is of the non-rechargeable type and in the form of a battery.

A circuit makes it possible to directly connect the battery to the sensor when the electrical energy produced by the first generator is insufficient.

This circuit has in particular for disadvantage of being a consumer of electrical energy and can be expensive when it comprises a microcontroller.

Moreover, in order to protect the power supply of the sensor from overvoltage, a zener diode is provided. Such a diode has for main disadvantage of having a reverse current, of a magnitude of several microamperes, which substantially increases the current consumption of the device.

The problem therefore exists of creating a new power supply device suited for a wireless sensor unit, provided with a first generator making it possible to recover an ambient electrical energy and a second backup generator, and which does not have the aforementioned disadvantages, in particular which is improved in terms of the consumption of electrical energy and in terms of cost for implementing.

DESCRIPTION OF THE INVENTION

This invention firstly relates to an electrical power supply device for delivering an electrical power supply to a wireless sensor unit, with the power supply device comprising:
   a first means of generating electrical energy configured to recover an ambient energy in the environment of the sensor unit and to produce an electrical energy according to the ambient energy recovered,
   a second generating means comprising a battery, in order to deliver an electrical energy intended to supply that produced by the first means of generating,
   a means of storing electrical energy comprising a capacitor arranged in such a way as to receive an electrical energy coming from the first means of generating and/or from the second means of generating, and to apply a given level of electrical power $V_{DD}$ to the sensor unit,
   the power supply device comprising a circuit for managing electrical energy configured to limit the given level of electrical power $V_{DD}$ between a lower limit $V_{minC1}$ and an upper limit $V_{MAXC1}$,
   said circuit comprising a unipolar transistor and conductor when its gate-source voltage is zero, the unipolar transistor being arranged in relation to the first means of generating, to the second means of generating, and to the means of storage, in such a way as to have a gate-source voltage that depends on the difference between the electrical energy delivered by the second means of generating and the given level of power supply.

The circuit for managing electrical energy has as such a very low consumption, which is particularly advantageous for supplying a wireless device of which the supply of electrical energy depends on a recovery of the energy in the environment.

The arrangement of the unipolar transistor can also be provided in such a way that its drain-source voltage depends on a difference between the electrical energy produced by the first means of generating and the given level of power.

With such a type of transistor the maintaining of the voltage $V_{DD}$ at a level less than a predetermined threshold $V_{MAXC1}$ is provided while still limiting the consumption of the power supply device.

The arrangement of the transistor is such that the threshold $V_{MAXC1}$ depends on the voltage delivered by the battery which is predetermined and depends on the battery chosen, and on the pinch voltage of the transistor which is predetermined and also depends on the transistor chosen.

According to a first possibility of implementation, the unipolar transistor defined hereinabove is a JFET transistor (for "Junction Field Effect Transistor"). Such a transistor has for advantage to have an intrinsic gate-source junction that can be used to pass electrical current in a single direction from the battery to the storage capacitor while still limiting its return to the battery.

According to a second possibility of implementation, the unipolar transistor defined hereinabove is a depletion MOSFET transistor.

The transistors JFET and depletion MOSFET have, contrary to MOS enhancement transistors that are more commonly used, a conducting channel when their gate-source voltage is zero.

The power supply device according to the invention furthermore makes it possible:
   to take advantage of the longer service life of the batteries as well as their improved current capacity and their reduced price in relation to rechargeable electrochemical generators;
   to be able to use batteries with a high internal resistance (for example of the button type) thanks to the storage capacitor capable of providing current peaks;
   to be able to guarantee a minimum operating time for a sensor unit independent of the availability of the ambient energy to be recovered;
   to require a low number of components, which makes it possible to realise gains in particular in terms of the cost of implementation.

The circuit for managing the electrical energy can also include means for blocking a return of current to the second means of generating, in order to protect the latter while still allowing for the passage of current in the opposite direction.

When the unipolar transistor defined hereinabove is a JFET transistor, the intrinsic junction between its gate and its channel forms a means for blocking a return of the current to the battery. The intrinsic junction can also make it possible to recharge the storage capacitor using the battery when the level of power $V_{DD}$ is low.

A diode arranged between the gate and the source of the unipolar transistor can also form a means for blocking a return of current to the second means of generating. This diode can also make it possible to recharge the storage capacitor using the battery when the level of power $V_{DD}$ is low.

According to a possibility of implementation, the second means of generating can include or be associated with means for limiting a discharge current of the battery, for example in the form of at least one resistor in series with the battery.

When the unipolar transistor is a JFET transistor, means for limiting a current through the intrinsic junction between the gate and the channel of the JFET transistor can be provided, for example in the form of at least one resistor connected to the gate of the transistor.

According to a possibility of implementation, the power supply device can further include means for blocking a return of current to the first means of generating, for example in the form of at least one diode.

According to a possibility of implementation of the power supply device, the first means of generating can include a photovoltaic module.

This invention further provides a wireless sensor unit comprising a power supply device such as defined hereinabove.

The sensor unit can as such be provided with at least one sensor of at least one physical magnitude to be measured and with a radio frequency module provided to carry out wireless communications, in particular in order to transmit to an external device data relating to the measurements carried out by the sensor.

The sensor unit can also include a circuit for processing measurement data of the magnitude or magnitudes measured coming from the sensor and for transmitting this data to the RF module.

The sensor unit can advantageously include one or several sensors from among the following sensors of physical magnitudes: humidity sensor, temperature sensor, luminosity sensor, gas sensor, in particular $CO_2$.

The invention also relates to a method of supplying a wireless sensor unit using a power supply device such as defined hereinabove.

BRIEF DESCRIPTION OF THE DRAWINGS

Other advantages and characteristics will appear more clearly in the following description, of particular embodiments of the invention, given by way of non-restricted examples, and shown in the annexed drawings wherein.

DETAILED DESCRIPTION OF PARTICULAR EMBODIMENTS

Figure 1:
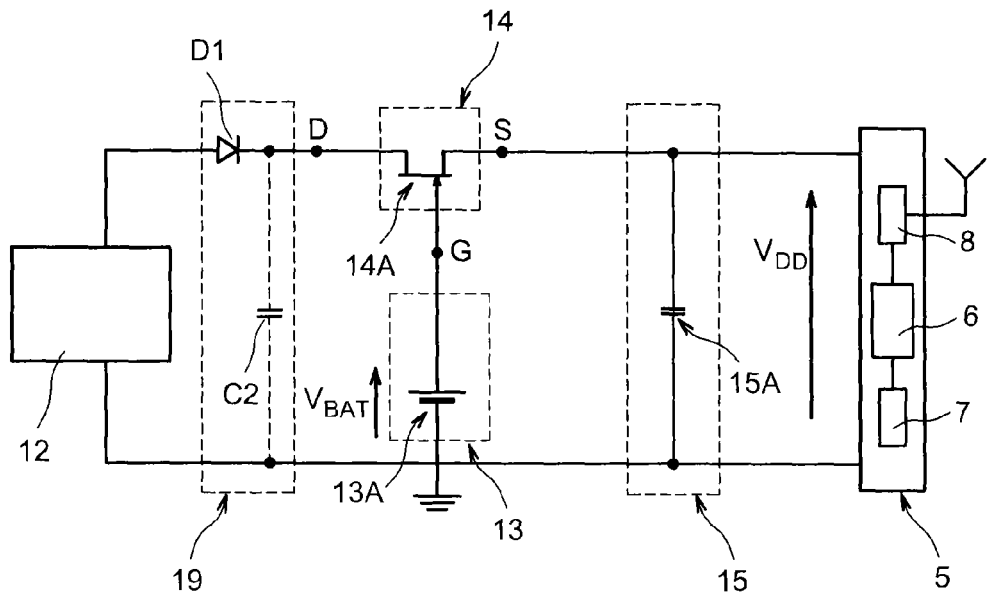
FIG. 1 shows a power supply device intended to supply a wireless sensor and which is implemented according to an embodiment of the invention.

FIG. 1 shows a diagram of a power supply device according to an embodiment of the invention.

This power supply device has for function to supply a sensor unit 5 comprising one or several sensors 7, and which can be provided with a processing circuit 6 and with an RF module 8. The sensor unit 5 is configured to establish wireless communications with an external device (not shown) and which relate to the measurements taken by the sensor or sensors 7.

The power supply device can be provided to deliver a supply of electrical energy to the sensor unit 5, in the form of current peaks, corresponding in particular to the instant when the sensor unit 5 takes measurements or communicates with the exterior.

The power supply device comprises a first means of generating 12 adapted to recover an energy referred to as "ambient" which is found in the environment of the sensor unit 5 and to convert this ambient energy into electrical energy used to supply the sensor unit 5. The ambient energy recovered can be for example, a thermal and/or mechanical, and/or electromechanical energy, and/or a light energy. According to a particular embodiment, the first means of generating 12 for recovering energy is advantageously a photovoltaic module.

At the output of the first means of generating 12, a rectifier block 19 can be provided. Such a block 19 also makes it possible to prevent a discharge of current to the first means of generating 12, in particular in a case where the electrical energy produced by the latter is low. This block 19 as such can include a diode D1 with a low voltage threshold $V_F$, for example of a magnitude of 0.3V such as a Schottky diode or a diode bridge (not shown). The rectifier block 19 can furthermore be provided with one or several filtering capacitors $C_2$.

The first means of generating 12 is associated with means for storing electrical energy 15 here formed of at least one capacitor 15A, of which the energy stored is used to supply the sensor unit 5. A capacitor 15A advantageously makes it possible to carry out a substantial number of charging and discharging cycles. The capacitor 15A used is more preferably a low-current self-discharge capacitor, for example a capacitor of the ceramic type.

The charging and discharging of the storage capacitor 15A are controlled in such a way as to provide a good level of supply $V_{DD}$ to the sensor unit 5, i.e. at a level of supply $V_{DD}$ which is higher than one limit or at a predetermined threshold, in particular a minimum voltage $V_{minc1}$ required to operate the sensor unit 5.

The level of supply $V_{DD}$ is furthermore controlled in such a way as to remain less than a limit or a threshold, in particular a predetermined maximum voltage $V_{MAXc1}$ according to the maximum voltage supported by the components of the sensor unit 5. The maximum voltage $V_{MAXc1}$ is furthermore provided to be low enough to make it possible to limit the consumption of the power supply device.

In the presence of ambient energy, here light energy, the power supply device can adopt a configuration wherein the means of generating 12 recharge the capacitor 15A, while in the absence of ambient energy, the power supply device is able to adopt another configuration wherein the capacitor 15A is recharged using a backup electrochemical generator 13.

In the power supply device according to the invention it is provided to use a backup generator that comprises a battery 13A i.e. a non-rechargeable electrochemical generator, of which the service life and the capacity in current are greater than those of a battery of battery of the same technology. The battery 13A can be for example with lithium i.e. with an lithium anode or a lithium compound, for example a battery referenced as CR2016 having a delivered voltage of about 3V and an electrical charge capacity of about 80 mAh, or for example a battery referenced as CR1220.

The control of the charge and the discharge of the capacitor 15A and of the level of supply $V_{DD}$ of the sensor unit 5, is provided for using a circuit for managing electrical energy.

In the power supply device according to the invention, the management circuit comprises a unipolar transistor 14 of the conducting channel type that delivers a non-zero current $I_{DS}$ when its gate-source voltage $V_{GS}$ is zero. Such a unipolar transistor can be of the JFET or depletion MOSFET type.

The arrangement of the circuit for managing electrical energy, and in particular the one of the unipolar transistor 14 is such that the gate-source voltage between the gate G and the source S of this transistor 14A depends on the difference between a voltage $V_{BAT}$ delivered by the backup electrochemical generator 13 and the voltage $V_{DD}$ at the terminals of the capacitor 15A and which is applied to the sensor unit 5. In the embodiment of FIG. 1, the gate of the unipolar transistor 14 is connected to the battery 13A while its source is connected to a terminal of the storage capacitor 15A. As such, the level of drain-source current Ids that the transistor 14 delivers is controlled by the difference between the level of charge of the capacitor 15A and the voltage delivered by the non-rechargeable electrochemical generator.

The unipolar transistor 14 is also arranged in such a way as to have a drain whereon the electrical energy produced by the first means of generating 12 is applied. The drain-source voltage between the drain D and the source S of the transistor 14A depends on the difference between the electrical voltage generated by the first means of generating 12 and the energy stored at the terminals of the capacitor 15A.

The unipolar transistor 14 of which the channel is conductive and which delivers a non-zero current $I_{DS}$ when its gate-source voltage $V_{AS}$ is zero, is as such provided to control the variations in the voltage $V_{DD}$ at the terminals of the capacitor by limiting in particular the maximum level of this voltage $V_{DD}$ applied to the sensor unit. The control of the voltage $V_{DD}$ is carried out by a managing of the respective supply in electrical energy coming from the first means of generating 12 and from the backup electrochemical generator 13.

In the embodiment shown in FIG. 1, the unipolar transistor is a transistor 14A of the JFET type (JFET for "Junction Field Effect Transistor") with an N-doped channel. Such a type of transistor has for advantage to comprise a junction in its gate and its channel also called "intrinsic junction" or "intrinsic diode" which can be used for the recharging of the storage capacitor 15A to the battery 13A.

Figure 2:
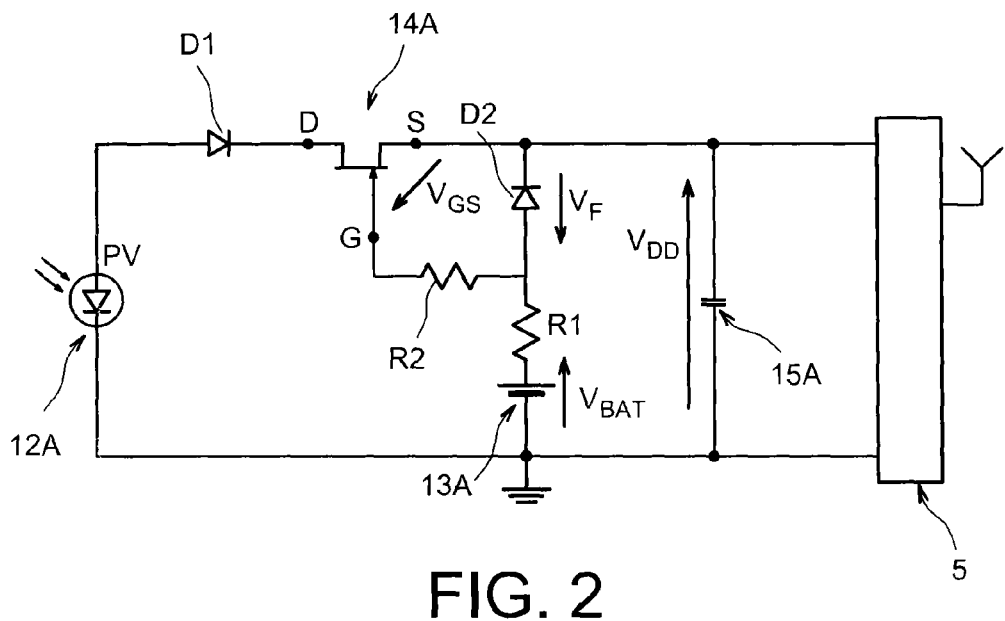
FIG. 2 shows a particular embodiment of the power supply device according to the invention provided with a circuit for managing electrical energy comprising an N-channel JFET transistor.

A particular embodiment of the power supply device is shown in FIG. 2, with a first means of generating 12 comprising a photovoltaic module 12A, and at the output of this module of means, for example in the form of a diode $D_1$, in order to block a return of current to the photovoltaic module 12A.

This example differs from that described previously in that means for blocking a return of current to the battery 13A, are here formed using a diode D2 between the gate and the source of the transistor 14A. The diode D2 can be a Schottky diode, which has for advantage of having a low threshold voltage $V_F$, for example of a magnitude of 0.3V This diode makes it possible to pass electrical current in a single direction from the battery to the storage capacitor with a low voltage drop.

In the particular embodiment of FIG. 2, the power supply device further comprises means for limiting the current delivered by the battery 13A in the form, for example, of at least one resistor $R_1$ in series with the battery 13A, as well as means for limiting the current in the diode or intrinsic junction of the JFET transistor 14A in the form for example of at least one resistor $R_2$ connected to the gate of the latter.

An operating mode of this device shall now be given. When the photovoltaic module 12A is in the presence of sufficient lighting, the capacitor 15A is recharged through the JFET transistor 14A.

When the capacitor 15A is strongly discharged, the gate-source voltage $V_{GS}$ of the transistor 14A is such that the latter is turned on in order to allow for a recharging of the capacitor by the battery.

When the capacitor 15A is not fully charged to its voltage $V_{MAXC1}$, the gate-source voltage $V_{GS}$ of the transistor 14A is such that the latter is turned on in order to allow for a recharging of the capacitor by the first means of generating 12.

The charge of the capacitor 15A can then be realised up to a maximum voltage $V_{DD}=V_{MAXC1}$, with $V_{MAXC1}=V_{BAT}-V_{GScutoff}$ where $V_{BAT}$ the voltage delivered by the battery 13A, $V_{GScutoff}$ (also noted as Vgsthreshold or pinch voltage) the gate-source voltage threshold beyond which the current Ids that flow from the drain to the source of the transistor becomes zero and the transistor becomes blocked, and which is negative for a JFET transistor of the N-doped channel type.

For example, for a battery 13A of the CR2032 type with a voltage $V_{BAT}$ delivered between 2.5 and 3.3V and a transistor 14A of the J/SST201 type having a voltage $V_{GScutoff}$ or Vgsthreshold of 0.9 V, there can be a maximum voltage $V_{MAXC1}$ of a magnitude of 3.3+0.9=4.1 V.

When the charge of the capacitor 15A is such that it reaches a threshold $V_{DD}=V_{MAXC1}$, in order to make it possible to prevent this maximum voltage $V_{MAXC1}$ from being exceeded, the transistor 14A blocks the current recharging the capacitor 15A. The circuit for managing electrical energy as such prevents a creation of an overvoltage in the supply $V_{DD}$ applied to the sensor unit 5A.

In the absence of lighting, or when the lighting is too low for the photovoltaic module 12A to be able to produce an electrical energy that is sufficient to supply the sensor unit 5, the capacitor 15A is recharged using the battery 13A through the diode D2 and the resistor R1 when $V_{DD}<V_{BAT}-V_F$ with $V_F$ the threshold voltage of the diode D2.

The resistor R1 placed in series with the battery 13A, this limits the discharge current of the latter and makes it possible to prevent damage or to shorten the service life of the battery 13A. In this operating mode without or with a low lighting of the photovoltaic module 12A, the transistor 14A remains turned on and the diode D1 makes it possible to protect the photovoltaic module 12A from a return of current.

The resistor R2 makes it possible to limit the passage of current through the intrinsic diode of the transistor 14A for a case where the voltage at the terminals of the capacitor 15A is such that $V_{DD} < V_{BAT} - V_F$, with $V_F$ is the smallest threshold voltage of the diode D2 and/or of the intrinsic diode of the JFET transistor 14A.

In a case where the current delivered by the battery 13A is less than the leakage or residual current of gate $I_{GSMAX}$ also noted as $I_{GSS}$ of the transistor 14A, the intrinsic diode that exists between its gate and its channel can be used in place of the diode D2 as in the example shown in FIG. 1, with the resistor R2 then also being optional.

Note that the reverse current $I_{GSS}$ of the diode D2 and/or the intrinsic diode of the JFET transistor 14A is generally very low, for example of a magnitude of 1 nA. The current $I_{GSS}$ shows the only static consumption of the circuit for managing the energy which is far less than the static consumption of solutions based on a zener diode or a linear regulator of the LDO (for "low-dropout") voltage. For information, a reverse leakage current of a zener diode limiting a voltage to 3.3V can be of a magnitude of 5 µA, i.e. much higher than a current $I_{GSS}$ of 1 nA and even higher than the average current consumed by certain wireless sensors.

The minimum voltage value $V_{minC1}$ above which the supply voltage $V_{DD}$ is limited can be expressed by the following relationship:

$V_{minC1} = V_{BAT} - V_F - (R1 + ESR_{BAT})*I_{DD\_MAX}$, with $I_{DD\_MAX}$ a maximum current consumed by the sensor unit 5, $ESR_{BAT}$ the internal resistance of the battery, $V_F$ the threshold voltage of the diode D2, which can be equal to about 0.3 V for a Schottky diode.

When the battery 13A is a battery of the CR2032 type, it is possible to have a voltage $V_{BAT}$ delivered by the latter between 2.5 and 3.3V, and $ESR_{BAT}$ for example of a magnitude of 15Ω as well as $I_{DD\_MAX}$ for example of a magnitude of 13 mA, and provide R1 of a magnitude of 0Ω. As such, for this type of battery, the minimum voltage value $V_{minC1}$ can be for example of a magnitude of 2V ($V_{minC1} = V_{BATmin} - V_F - (R1 + ESR_{BAT})*I_{DD\_MAX} = 2.5V - 0.3V - (15Ω)*13$ mA=2V).

Figure 3:
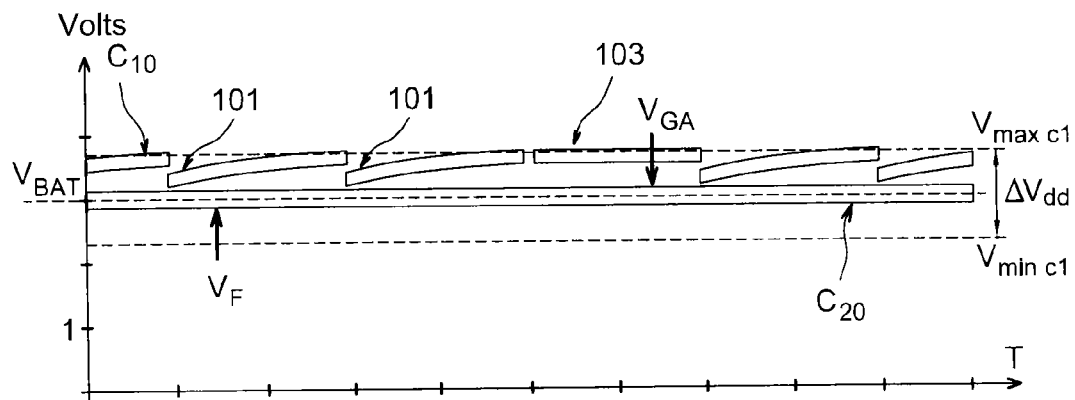
FIG. 3 shows an example alternative of a supply voltage able to be delivered by a power supply device according to an embodiment of the invention.

FIG. 3 shows variations in the voltage $V_{DD}$ provided at the output of the power supply device described hereinabove in the presence of lighting. Current peaks (abrupt variations 101 on the curve $C_{10}$) are consumed by the sensor unit 5 at the instant when it is taking measurements and/or a radio communication. Between these instants (stable portion 103 on the curve $C_{10}$) the sensor unit is on standby.

In the presence of lighting, the photovoltaic module 12A as such directly recharges the capacitor 15A at a voltage that remains less than a limit or a predetermined threshold $V_{MAXC1}$ which depends on the voltage $V_{BAT}$ delivered by the battery and $V_{GSthreshold}$ the gate-source voltage threshold beyond which the current $I_{DS}$ which flows from the drain to the source of the transistor becomes zero and the transistor becomes blocked.

In this particular embodiment, the capacity of the storage capacitor 15A was provided in such a way that a current peak caused by a measuring cycle of the sensor unit and/or a radio communication does not discharge the capacitor more than $\Delta V = V_{MAXC1} - V_{BAT}$. Through this optimisation the wear and tear of the battery 13 can be limited of which the electrical energy is not consumed in the sufficient presence of energy to be recovered.

Figure 4:
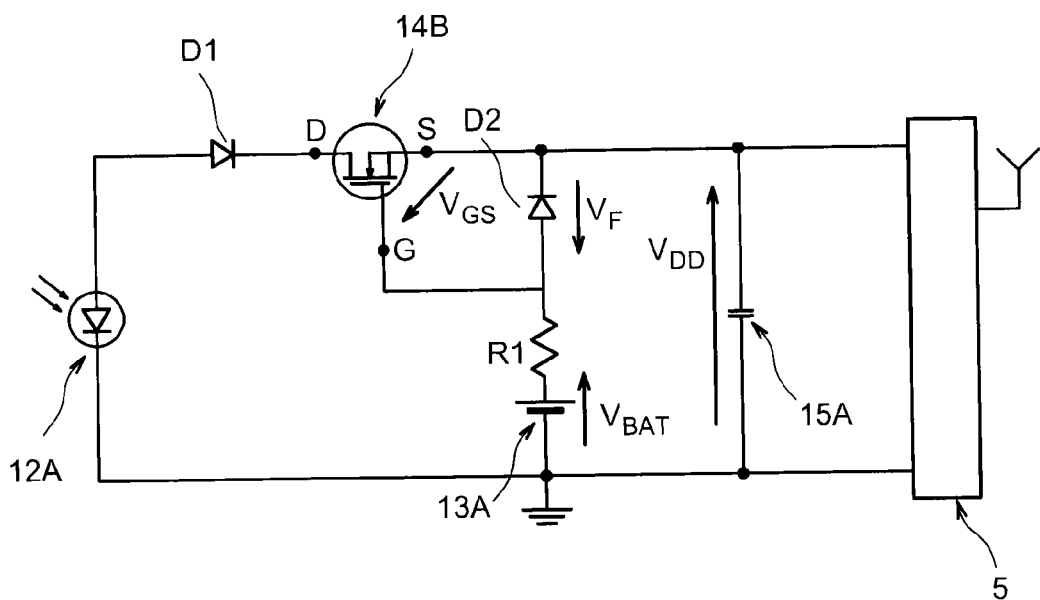
FIG. 4 shows an alternative power supply device according to the invention provided with a circuit for managing electrical energy comprising a depletion N-type MOSFET transistor.

An alternative embodiment (FIG. 4) of the example described hereinabove provides to replace the N-channel JFET transistor JFET with another type of unipolar transistor, in particular a depletion MOSFET transistor 14B and which is also a conductor when the gate-source voltage $V_{GS}$ is zero.

The example embodiments of the circuit for managing electrical energy of the power supply device were provided with N-type unipolar transistors.

Figure 5:
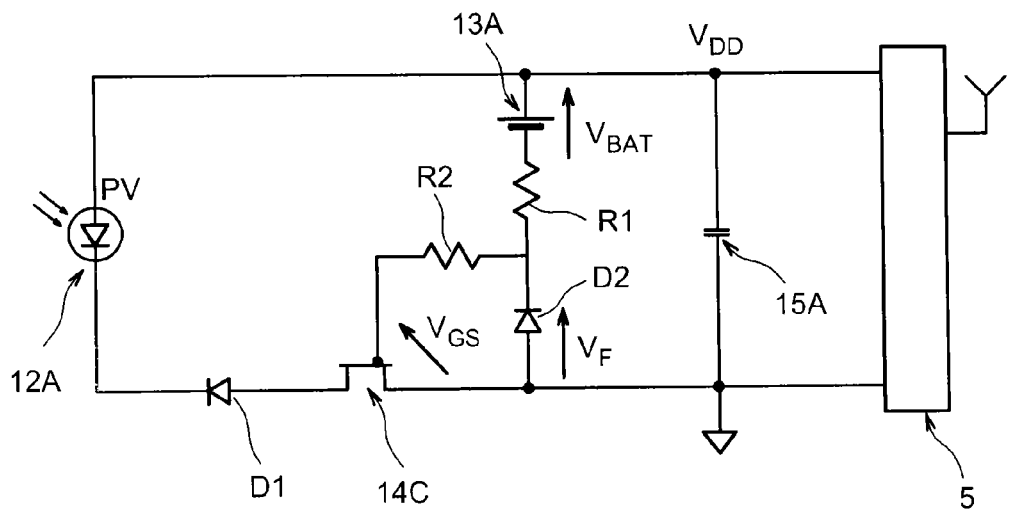
FIG. 5 shows another alternative of the power supply device according to the invention provided with a circuit for managing electrical energy comprising a P-channel JFET transistor.

An alternative embodiment shown in FIG. 5 provides to replace in the circuit for managing electrical energy, the N-channel JFET transistor with a P-channel JFET transistor.

Figure 6:
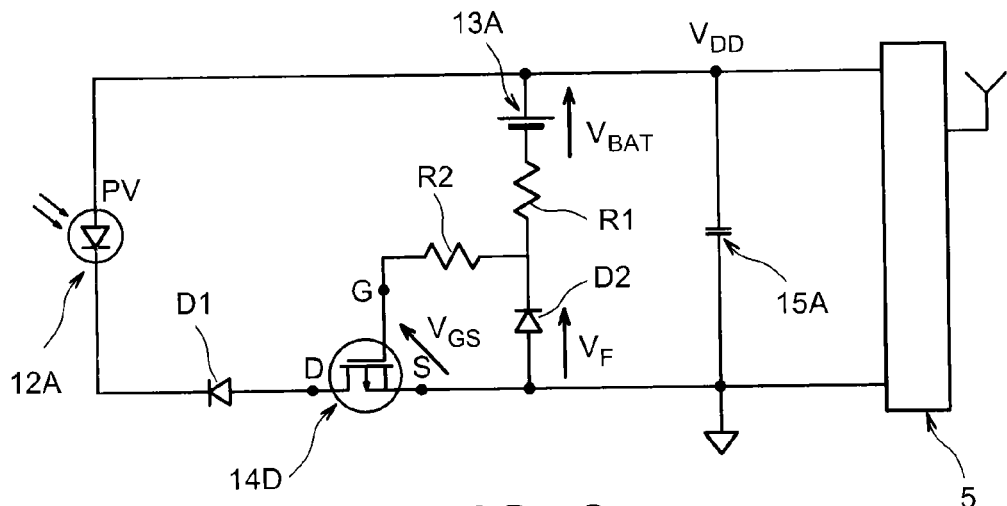
FIG. 6 shows another alternative power supply device according to the invention provided with a circuit for managing electrical energy comprising a P-type depletion MOSFET transistor.

Another alternative embodiment shown in FIG. 6, provides for the replacing of the MOSFET depletion transistor and of the N channel type with a JFET MOSFET depletion transistor with an N-doped channel.

The sensor unit 5 supplied by one or the other of the examples of power supply devices described hereinabove comprises a module provided with one or several sensors 7 configured to detect one or several physical magnitudes to be measured, for example such as temperature, pressure, humidity, light.

This module can also include a gas sensor which can be for example adapted to detecting and measuring $CO_2$, and/or a motion sensor.

The processing circuit 6 connected to the sensor or sensors 7 makes it possible to process measurement data of the magnitude or magnitudes to be measured, which can then be translated into a radio frequency signal by the communication module 8 and communicated to an external device via a wireless connection.

The invention claimed is:

1. Electrical power supply device for delivering an electrical power supply to a wireless sensor unit, with the power supply device comprising:
    a first electrical energy generator configured to recover an ambient energy in the environment of the sensor unit and to produce an electrical energy according to the ambient energy recovered,
    a second electrical energy generator comprising a battery in order to deliver a backup electrical energy,
    an electrical storage component comprising a capacitor arranged in such a way as to receive an electrical energy coming from the first generator and/or from the second generator, and to apply a given level of electrical power to the sensor unit,
    an electrical energy management circuit configured to limit the given level of electrical power between a lower limit and an upper limit,
    said electrical energy management circuit comprising a unipolar transistor with a conducting channel when its gate-source voltage is zero, with the unipolar transistor being arranged in relation to the first generator, to the second generator, and to the storage circuitry, in such a way that the gate-source voltage depends on a difference between the electrical energy delivered by the second generator and the given level of power supply and the gate-source voltage is independent of the electrical energy delivered by the first generator.

2. The device according to claim 1, wherein the unipolar transistor is a JFET transistor.

3. The device according to claim 1, wherein the unipolar transistor is a MOSFET depletion transistor.

4. The device according to claim 1, further comprising a circuitry for recharging the electrical storage component using the second generator while still preventing a return of current to the second generator.

5. The device according to claim 4, wherein the unipolar transistor is a JFET transistor comprising an intrinsic junction between its gate and its channel, with said circuitry includes said intrinsic junction.

6. The device according to claim 4, wherein said circuitry includes a diode between the gate and the source of the unipolar transistor.

7. The device according to claim 1, wherein the second generator comprises at least a resistor or a component for limiting a discharge current of the battery.

8. The device according to claim 1, wherein the unipolar transistor is a JFET transistor, the device further comprising at least a resistor or a component for limiting a current through an intrinsic junction between the gate and the channel of the JFET transistor.

9. The device according to claim 1, further comprising a diode or a component for blocking a return of current to the first generator.

10. The device according to claim 1, with the first generator comprising a photovoltaic module.

11. A Sensor unit comprising:
at least one sensor of at least one physical magnitude to be measured,
a processing circuit connected to said sensor in order to process measurement data of the magnitude to be measured, and
a radio frequency module for wireless communication,
a power supply device according to claim 1.

12. The sensor unit according to claim 11, comprising at least one sensor from among the following physical magnitude sensors: humidity sensor, temperature sensor, luminosity sensor, gas sensor.

13. A method for supplying with electricity a wireless sensor unit, with the method comprising the use of a power supply device according to claim 1.

* * * * *